(12) United States Patent
de Queiroz et al.

(10) Patent No.: US 7,215,817 B2
(45) Date of Patent: May 8, 2007

(54) SYSTEM AND METHOD FOR DIGITAL WATERMARKING IN A CALIBRATED PRINTING PATH

(75) Inventors: Ricardo L. de Queiroz, Brasilia (BR); Robert P. Loce, Webster, NY (US); Karen M. Braun, Fairport, NY (US); Raja Bala, Webster, NY (US)

(73) Assignee: Xerox Corporation, Stamford, CT (US)

( * ) Notice: Subject to any disclaimer, the term of this patent is extended or adjusted under 35 U.S.C. 154(b) by 782 days.

(21) Appl. No.: 10/644,342

(22) Filed: Aug. 20, 2003

(65) Prior Publication Data

US 2005/0041832 A1    Feb. 24, 2005

(51) Int. Cl.
*G06K 9/36* (2006.01)
*G06K 9/00* (2006.01)

(52) U.S. Cl. .................................... 382/233
(58) Field of Classification Search ................ 382/100, 382/162, 164, 166, 190, 195, 232, 233; 358/1.2, 358/1.9, 2.1, 3.01, 3.24, 501, 517; 347/15, 347/43, 224, 232
See application file for complete search history.

(56) References Cited

U.S. PATENT DOCUMENTS

| 5,699,102 | A | * | 12/1997 | Ng et al. ..................... 347/224 |
| 5,923,774 | A | | 7/1999 | Ostromoukhov |
| 6,643,030 | B1 | | 11/2003 | Loce et al. |
| 2002/0164052 | A1 | | 11/2002 | Reed et al. |

FOREIGN PATENT DOCUMENTS

| EP | 1 229 725 | 8/2002 |
| WO | WO 03/005291 | 1/2003 |

* cited by examiner

Primary Examiner—Amir Alavi

(57) ABSTRACT

What is disclosed is a decoding method for retrieving information bits encoded in a printed image comprising the steps of first receiving an input electronic image as a scanned version of the printed image. A region of interest in the image is then extracted and, for that region, an amount of K colorant present, denoted $K_H$, is obtained. Further, a color value is generated therefrom and the GCR used for encoding that region is determined using $K_H$ and the obtained color value. Encoded information bits are retrieved therefrom based on the determined GCR. The estimated $K_H$ is preferably evaluated conditional to a capacity signal $K_L$ and a luminance signal L. From the obtained data, values of $K_H$, $K_L$, and L, are derived wherein $K_H$ is estimated from a high resolution scan, and $K_L$ and L are estimated from a down-scaled image, respectively. The capacity signal $K_L$ and the luminance signal L are derived from the obtained color value. Further, the capacity signal, $K_L$ is derived by first applying a suitable operator S to reduce the image from scanner resolution to the watermark resolution and then converting the obtained color values to CMY estimates such that $K_L=\min(C,M,Y)$ Alternatively, K-capacity is derived from the amount, $K_L$, y, comprises first converting the obtained color values to CMY estimates and applying a suitable operator S to reduce the image from scanner resolution to the watermark resolution such that $K_L=\min(S(C), S(M),S(Y))$; wherein L is described by a linear combination of scan signals RGB, such that $L=k_1S(R)+k_2S(G)+k_3S(B)$. The value of $K_H$ is determined by first converting the obtained color values to CMY estimates. The estimates determine K-colorant amount at each pixel such that: $K=\min(C,M,Y)$. A suitable operator S is applied to reduce the image from scanner resolution to the watermark resolution.

34 Claims, 2 Drawing Sheets

SYSTEM AND METHOD FOR DIGITAL WATERMARKING IN A CALIBRATED PRINTING PATH

RELATED CASES

Reference is made to commonly-assigned copending U.S. patent application Ser. No. 10/644,472, entitled A SYSTEM AND METHOD FOR DIGITAL WATERMARKING IN A CALIBRATED PRINTING PATH, by Ricardo L. de Queiroz et al, the disclosure(s) of which are incorporated herein.

FIELD OF THE INVENTION

The present invention generally relates to watermarking methods and, more particularly, to those methods for digital watermarking which embed hidden data in a manner designed for the printing process having high information channel capacity while not degrading image texture or resolution

BACKGROUND OF THE INVENTION

For many reasons, it is desirable to enable data hiding within a digital image. Those reasons include image security, authentication, covert communication, rendering instructions, and providing additional useful information. Some existing digital watermarking methods do not survive the printing process as most watermarking methods are designed for use in a non-printed contone image. Existing methods designed for contone images are too fragile to be encoded into a print and be retrievable. Glyphs and other low frequency methods that can be used in a print setting often introduce undesirable textures or lower the spatial resolution of the image.

Many printing processes produce color by combining 4 or more colorants. The most common case is the use of cyan, magenta, yellow, and black colorants, referred to herein as C,M,Y,K. It is well known that these 4 colorants can be combined in many different ways to produce the same color, as perceived by the human visual system. For a given image or application, the specific method of combining C, M, Y, K is determined by the gray-component replacement (GCR) function. This function is, in general, a multidimensional mapping that relates the basic subtractive primaries, C, M, Y to the actual C, M, Y, K colorants that constitute the final printed image. A simple and common form of the GCR function is defined by a pair of functions: one that relates min(C, M, Y) to the amount of K to be added, and another that relates min(C, M, Y) to the amount of C, M, Y to be removed or replaced by the K. The two functions are dependent upon each other in a way that yields the desired color. Note that the quantity min(C, M, Y) is the amount in which all three colorants are present, and thus is qualitatively thought of as the "gray component" of the color. Functions of this quantity that dictate the amount of K to be added and the amount of CMY to be replaced are thus collectively termed "gray component replacement".

In principle, a given image can be rendered with different GCR functions to yield visually similar or identical color renditions. Of these a single GCR function is generally chosen to render a given image or object within a page. The choice is based on a number of factors, including achievable print gamut, colorant area coverage limitations, smoothness and texture considerations, sensitivity to registration, colorant cost, etc.

What is needed in the art is a watermarking method designed for use in the printing process which does not degrade textures and which has a high information channel capacity.

BRIEF SUMMARY

What is disclosed is a decoding method for retrieving information bits encoded in a printed image comprising the steps of first receiving an input electronic image as a scanned version of the printed image. A region of interest in the image is then extracted and, for that region, an amount of K colorant present, denoted $K_H$, is obtained. Further, a color value is generated therefrom and the GCR used for encoding that region is determined using $K_H$ and the obtained color value. Encoded information bits are retrieved therefrom based on the determined GCR. The estimated $K_H$ is preferably evaluated conditional to a capacity signal $K_L$ and a luminance signal L. From the obtained data, values of $K_H$, $K_L$, and L, are derived wherein $K_H$ is estimated from a high resolution scan, and $K_L$ and L are estimated from a downscaled image, respectively. The capacity signal $K_L$ and the luminance signal L are derived from the obtained color value. Further, the capacity signal, $K_L$ is derived by first applying a suitable operator S to reduce the image from scanner resolution to the watermark resolution and then converting the obtained color values to CMY estimates such that $K_L$=min(C,M,Y) Alternatively, K-capacity is derived from the amount, $K_L$, y, comprises first converting the obtained color values to CMY estimates and applying a suitable operator S to reduce the image from scanner resolution to the watermark resolution such that $K_L$=min(S(C), S(M),S(Y)); wherein L is described by a linear combination of scan signals RGB, such that $L=k_1 S(R)+k_2 S(G)+k_3 S(B)$. The value of $K_H$ is determined by first converting the obtained color values to CMY estimates. The estimates determine K-colorant amount at each pixel such that: K=min(C,M,Y). A suitable operator S is applied to reduce the image from scanner resolution to the watermark resolution.

BRIEF DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which.

DESCRIPTION OF THE SPECIFICATION

Figure 1:
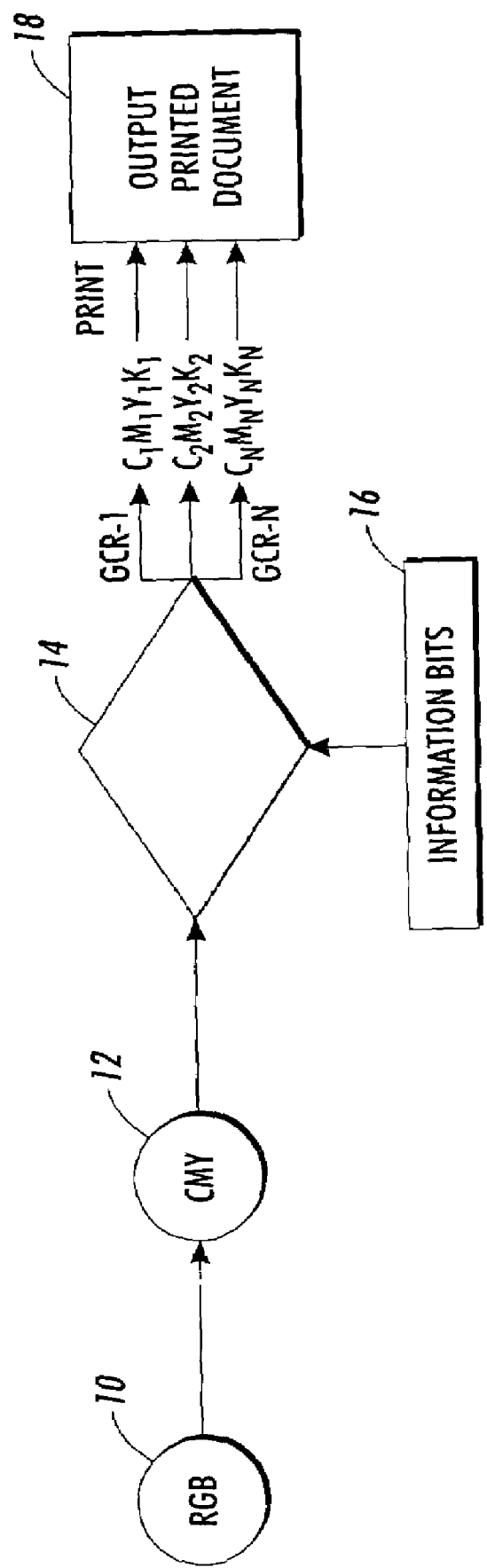
FIG. 1 illustrates the method of the present invention of inserting a watermark.

A method is disclosed for encoding or digital watermarking (data hiding) for use in the printing process and decoding. Attention is respectfully directed to FIG. 1. An input pixel 10 is received in an RGB color space or an other color space which has been converted to CMY values, at 12. Alternatively, the input pixel is received as a CMY pixel.

Two or more GCR functions are loaded into GCR processor 14 (shown referenced as GCR-1, GCR-2, . . . , GCR-N). For N GCR functions, information 16 to be transmitted is converted therein into N-ary form. The N-ary form is one wherein the information at each pixel can be represented by one of N levels. For example, if two GCR functions are to be used (N=2), the N-ary form for the information is binary, so that each pixel is represented by one of two levels [0, 1]. One might choose GCR1≡100% GCR (maximum amount of gray component is replaced with K) to encode every 0, and GCR2≡0% GCR (no K is used to replace the gray component) to encode every 1. Expressed analytically, GCR1 and GCR2 of this simple example perform the transformation: $CMYK_1=(C-min(C,M,Y), M-min(C,M,Y), Y-min(C,M,Y), min(C,M,Y))$; for $GCR-1 \equiv GCR_{100\%}$; $CMYK_2=(C, M, Y, 0)$; and for $GCR-2 \equiv GCR_{0\%}$; where C, M and Y on the right side of the equations indicate values into the GCR processor 14, and C, M, Y, and K on the left side of the equations indicate values output from GCR processor 14.

From the same CMY data input to GCR processor 14, more specifically, from the same CMY data at a particular image location, two or more alternative CMYK sets can be generated and output from GCR processor 14. The particular CMYK set utilized at the given location indicates the information state encoded at that location. For instance, using the example of 0% and 100% GCR from above, CMYK=(C,M,Y,0) at a particular location would have a 1 encoded at that location.

The information bits 16 are arrayed in a sequence that produces a spatial orientation and layout when the CMYK values are printed. For instance, an 8×8 pixel block of CMY data may receive the encoding of the first N-ary number formed from the information bits. The second 8×8 block may receive the second N-ary number, and so on. Different block configurations may be used, or encoding may follow other space filling paths, such as along a space filling curve. Also, the encoding could be adaptive to image content, so that particular image features, such as letters, graphic objects, pictures, etc., provide the spatial support for the encoding process. Since the data is arrayed spatially in the image, in some cases it is useful to have a reference point on the page from which the sequence of information can be read. The reference point could be a corner, a specially designed cross or dot pattern, or some agreed upon image feature.

There are several ways that GCR processor 14 can convert input CMY values to output CMYK values. One example of operation processes the incoming data at a location only with the GCR function selected by the information bits (N-ary number) to be encoded at that location. Another method processes the incoming CMY data with all GCR functions, and the information bits associated with that location in space select the CMYK data to be used in forming the image. The CMYK sets formed thereby are printed to form output image 18. The information bits are now embedded onto the output print.

If the printing path has been properly calibrated, printed CMYK sets, associated with GCR functions, will look essentially the same under the illuminant for which the calibration was performed. The GCR functions should be optimized so that they are easily differentiated from each other in the subsequent decoding process, while at the same time, producing colors that are visually substantially similar under the calibration illuminant.

It should be appreciated by one skilled in this art that some regions in the output image will be less useful than others for embedding information using the present method. This includes regions where little or no GCR is necessary (e.g., C=0 or M=0 or Y=0) and very dark regions because it is more difficult to detect black pixels from high-resolution scans due to excessive dot overlap. These regions may be considered to have low or zero channel capacity for information. Various methods can be used to avoid information loss that could occur by attempting to encode information in these regions. For instance, the information could be encoded redundantly, throughout the image, thereby increasing the likelihood of transmitting the information in the print. Otherwise, low information capacity regions can be recognized by their input CMY values, and those regions can be skipped in the encoding processing, and encoding would resume when the next region was input to GCR processor that had sufficient information capacity.

Although current color management software found in the arts allows different GCR functions to be applied to different objects, the purpose therein is to enable the optimization of image quality whereas, the present invention uses it convey information. The present encoding method is described as spatially varying, as in varying across a pictorial image. It should be understood that the GCR may also vary with objects on a page. For instance different graphical features, letters, vignettes, and the like could each have a different GCR that is optimized to carry information. The watermark information can be a tag plane, or auxiliary image plane sometimes referred to as an omega channel or alpha channel, that is used to select the GCR functions in the encoding.

Figure 2:
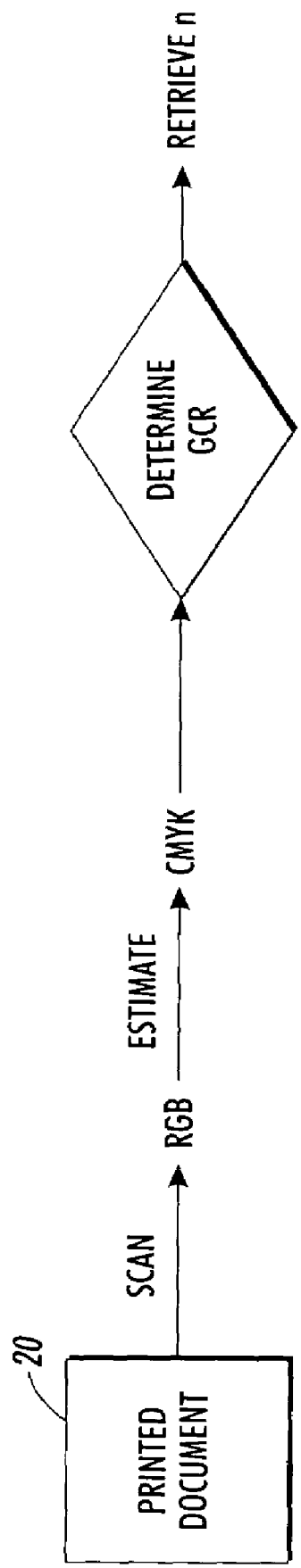
FIG. 2 illustrates the method of the present invention of extracting the watermark.

With reference now being made to FIG. 2, to decode the embedded information, the printed document 20 is scanned into electronic form. The data contained therein are converted to RGB color space by this scanning process. The K colorant amounts are then estimated from the RGB data. By design, two or more colors match visually even though they were produced with different GCR strategies and thus have different K amounts for the same colored area. Thus, to retrieve K values from RGB data, information in addition to colorimetric values is used. In the present invention, the non-overlap properties of rotated halftone screens provide this additional information.

The K-colorant signal, denoted $K_H$, is estimated from a high-resolution scan of the RGB image. In one embodiment, this K-colorant signal is evaluated conditional to a capacity signal $K_L$ which relates the capacity of pixels to possess K-toner to luminance L. The importance of deriving $K_L$ is to normalize the value of $K_H$ against some reference point. Different GCR strategies generate images that may look different except under some illuminant for which the color correction was derived, i.e., illuminant metamerism might occur between the viewing illuminant and the scanner illuminant. Thus the GCR (and hence, the embedded bit data) is estimated by analyzing the vector $\{K_L, K_H, L\}$, i.e., the value of $K_H$ given $K_L$ and L.

In an alternate preferred embodiment, the K-colorant signal, $K_H$, is evaluated conditional to a low-resolution colorimetric signal from the image, RGB. In other words, RGB is a low resolution measure of the color of a local area and provides a measure of the capacity of that area to possess K-colorant. The GCR (hence, the embedded bit data) is estimated by analyzing the vector $\{R, G, B, K_H\}$, i.e., the value of $K_H$ given R, G, B.

The scanned RGB values may be inverted to obtain CMY estimates: C=1−R, M=1−G, Y=1−B. One can then estimate $K_H=min(C,M,Y)=1-max(R,G,B)$. If S is a suitable operator to reduce the image from the scanner resolution to the watermark resolution (e.g., a sequence of blurring filters followed by sub-sampling), then $K_H=S(min(C,M,Y))=S(1-max(R,G,B))$. Even though $K_H$ resembles that for generating K in a 100% GCR strategy, its present use is limited to high-resolution scanned data where the printer dots are discernible.

In an alternate embodiment, scanner RGB values can be converted to an estimate of CMY by a calibration of the scanner system. For example, a 3×3 linear transformation matrix can be used to best relate scanner RGB values to actual known amount of cyan, magenta, and yellow used in the print. It will be appreciated by those skilled in the art that other transformations can be used to relate scanned RGB to printed CMY. This transformation can be used to improve the estimation of K from scan RGB in the actual embedded prints.

In the alternative, spatial properties of the high-frequency image are exploited to determine $K_H$. Assuming halftoning with rotated screens, CMY dots do not frequently overlap completely in the highlight and mid-tone regions. Typically, the amount of overlap of CMY dots covers a small area percentage at highlights and mid-tones. If the input image has perfect dots and a scanner that has high enough resolution that it is able to perfectly scan the dots and their overlaps is used, then the scanned RGB values thereof only assume a small number of combinations that depend on the geometry of the dots against the scanner resolution. If each of the RGB values for any given pixel in the scan are low enough then that pixel essentially comprises all black color. A black-colored pixel can then be assumed a K dot. This K dot assumption is a good approximation because for low RGB there must be either a K dot or an overlapping of CMY dots. Because the overlap area of CMY dots is often small in highlights and mid-tones (due to rotated screens) it is therefore probable that the black-colored pixel is a K dot. Additional information, for example, ensuring that the pixel has very low chroma, is also useful. Preferably, a combination of luminance and chroma can be used to distinguish between a K dot and an overlap of CMY dots.

Additionally, at the dot center, a small K dot on a light background will have a lightness that is higher than a larger K dot on a darker background. Thus a transformation is necessary to normalize the lightness of the dot based on the scanned RGB. This is done as follows. One out of N GCRs can be estimated by first, in the training session, determining one image or region that was processed with each GCR. For each region or image, compute $\beta i$, $K_L$, $L=E(K_H | K_L, L, GCR=i)$, i.e., the average value of $K_H$ for each ($K_L$, L) pair. In the on-line detection phase, find the $\beta$ that is the closest to the received $K_H$. In the binary case, there are only two values to compute, $\beta(1, K_L, L)$ and $\beta(2, K_L, L)$ so that it is easier to set up threshold: $\tau(K_L, L)=[\beta(1, K_L, L)+\beta(2, K_L, L)]^{1/2}$ such that $K_H$ is simply compared to a threshold $\tau(K_L, L)$. The array of the thresholds (typically 256×256) is preferably setup beforehand to simplify the computation, i.e., detection can be made with one look-up and one comparison. Thus the determination of which pixel is associated with a K dot depends on the average lightness of the region. Because $K_L$ relates to RGB in an average colorimetric way and does not comprehend microscopic halftone dot geometry, it can be reduced (using S as defined) to: $K_L=1-\max(S(R), S(G), S(B))$. The luminance value from the low-resolution scans is: $L=a\ S(R)+b\ S(G)+c\ S(B)$.

In the alternative, for decoding the GCR-based watermark, the function $\beta(i, RGB)$ which relates the expected amount of K to the scanned RGB signal, is obtained through a separate calibration process, as follows. A set of CMY values is generated, preferably as a 3-dimensional grid in CMY space. These values are processed through each of the N GCR functions to obtain N sets of CMYK values. If other functions, such as ink-limit, and tone reproduction curves (TRCs), are applied during nominal printing of images, these functions are to also be applied to the CMYK data. Subsequently, from each CMYK data set, a target of patches is generated, printed and scanned. The estimate $\beta(i, RGB)=$ 1, . . . N, of the amount of black colorant in each patch is obtained for each of the N scanned targets corresponding to the N GCR functions. One exemplary method for doing this has been described previously. The black estimates are then used to populate a 3-dimensional lookup table (LUT) whose inputs are the scanned RGB values, and whose outputs are the N values of $\beta$ values corresponding to the N GCR functions.

Given a scan of an arbitrary printed image, the black estimate $K_H$ is derived using the same algorithm employed in the aforementioned calibration procedure. The RGB values of the scanned pixels are used to index the 3D LUT, and $K_H$ is compared with each of the N number of $\beta$ values. The closest $\beta$ value determines which of the N-symbols was encoded at the given image location.

In the case where N=2, one can alternatively fill the 3-D LUT with the threshold: $\tau(RGB)=[\beta(1, RGB)+\beta(2, RGB)]^{1/2}$. The received black estimate $K_H$ is then simply compared with $\tau(RGB)$ to determine which of the two symbols was encoded at the given image location.

It is to be appreciated that methods for filling 3-D LUTs given an arbitrary sampling of input and output data is well known in the art. See for example: R. Bala, *DEVICE CHARACTERIZATION*, Digital Color Imaging Handbook, Chapter. 5, by: G. Sharma, Ed., CRC Press, 2003. It is also noted that pre-conditioning transforms may be applied prior to the 3-D LUT that increase the efficiency and accuracy of the 3-D LUT. For example, a 3×3 pre-conditioning matrix that approximately maps scanned RGB to printer CMY can be followed by a 3-D LUT that maps the said printer CMY to the $\beta$ values. Since the original calibration targets are designed as grids in CMY space, such a preconditioning transform should result in a better utilization of nodes in the 3-D LUT. Also it attempts to explicitly recover the original GCR, which is a mapping from CMY to K, rather than a mapping from scanner RGB to K.

In an alternative look-up-table method for decoding, the system is similarly trained using a test target, and for every pixel, a quintuple: [R, G, B, K, Q] is organized where Q is a discrete number telling which GCR was used to print that pixel. The RGBK hypercube is mapped into one number Q. The training method works by simple majority: The RGBK hypercube is divided into N number of cells. Then for every pixel in the printed-and-scanned image, KH and RGB are determined. The appropriate Q value is associated with the cell. This is repeated for each pixel in every target. After entering the values for every cell, a histogram of Q values is determined. The most popular Q value is entered at that cell location. Then a LUT is constructed with the RGBK values as input and Q as output Thus each cell maps the RGBK value to its most likely GCR strategy. To ensure that no cells are empty, we start by running the above training algorithm with partition of RGBK into 2×2×2×2 cells. If any of the cells is empty, a random Q value is assigned to it. The process is repeated for the 4×4×4×4 cell partition. At the end of the process, any empty cells inherits the Q value from its corresponding position in the 2×2×2×2-partition stage. For non-empty cells, the 4×4×4×4 value is used. The process is repeated for 8×8×8×8. Any empty cells inherit the corresponding Q value from the 4×4×4×4 partition stage. The process is repeated again to obtain 16×16×16×16 cells, inheriting Q values from the 8×8×8×8 partition stage. The 16×16×16×16 partition is probably accurate enough to map RGBK values to a small number of GCR functions. The run-time detection algorithm works as follows. In the high resolution image, estimate $K_H$. Reduce $K_H$ image to low resolution. Then, reduce RGB scanner data to low resolution. For every pixel in the low resolution image, compute the $RGBK_H$ quadruple. Feed that $RGBK_H$ into the cell LUT, retrieve Q which is the GCR estimation.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A decoding method for retrieving information bits encoded in a printed image comprising the steps of:
    receiving an input electronic image as a scanned version of the printed image;
    extracting a region of interest in the image;
    estimating, for said region, amount of K colorant present, denoted $K_H$;
    obtaining, for said region, a color value;
    determining the GCR used for encoding that region using $K_H$ and said obtained color value; and
    retrieving encoded information bits based on said determined GCR.

2. A decoding method, as in claim 1, wherein estimated $K_H$ is evaluated conditional to a capacity signal $K_L$ and a luminance signal L.

3. A decoding method, as in claim 2, further comprising deriving from said obtained RGB data the values of $K_H$, $K_L$, and L, wherein $K_H$ is estimated from a high resolution scan, and $K_L$ and L are estimated from a down-scaled image, respectively.

4. A decoding method, as in claim 2, wherein the capacity signal $K_L$ and the luminance signal L are derived from said obtained color value.

5. A decoding method, as in claim 2, further comprising determining $K_L$ by:
    applying a suitable operator S to reduce the image from scanner resolution to the watermark resolution;
    converting the obtained color values to CMY estimates; and
    using said estimates to determine K-colorant amount by $K_L=\min(C,M,Y)$.

6. A decoding method, as in claim 2, further comprising determining K-capacity amount, $K_L$, by:
    converting said obtained color values to CMY estimates;
    applying a suitable operator S to reduce the image from scanner resolution to the watermark resolution; and
    using said estimates to determine K-colorant amount by $K_L=\min(S(C),S(M),S(Y))$.

7. A decoding method, as in claim 2, wherein L is described by a linear combination of scan signals RGB, such that $L=k_1 S(R)+k_2 S(G)+k_3 S(B)$.

8. A decoding method, as in claim 2, wherein determining one out of N GCRs comprises:
    determining one region of said input that was processed with each GCR; and
    for each region,
        computing $\beta(n,K_L,L)=E(K_H|K_L, L, GCR=n)$;
        determining $\beta$ that is the closest to $K_H$;
        creating a threshold $\tau(K_L,L)=[\beta(1, K_L, L)+\beta(2, K_L, L)]^{(1/2)}$; and
        comparing $K_H$ to threshold $\tau$ ($K_L$, L).

9. A decoding method, as in claim 1, further comprising $K_H$ by:
    converting said obtained color values to CMY estimates;
    using said CMY estimates to determine K-colorant amount at each pixel by $K=\min(C,M,Y)$; and
    applying a suitable operator S to reduce the image from scanner resolution to the watermark resolution, $K_H=S \min(C,M,Y)$.

10. A decoding method, as in claim 9, wherein the operator S is a sequence of blurring filters followed by sub-sampling.

11. A decoding method, as in claim 9, further comprising converting the said obtained color values to CMY estimates by inverting scanner RGB values, such that $C=1-R$, $M=1-G$, and $Y=1-B$, such that $K_H=S \min(C,M,Y)=S[1-\max(R,G,B)]$.

12. A decoding method, as in claim 11, wherein the thresholding is performed in lightness, and dark pixels are considered part of a K dot.

13. A decoding method, as in claim 11, wherein the thresholding is performed in chroma and lightness, and dark, non-chromatic pixels are considered part of a K dot.

14. A decoding method, as in claim 11, wherein the threshold level for K dots is varied relative to the average darkness of the patch.

15. A decoding method, as in claim 9, wherein said obtained color values are converted to CMY estimates by a 3×3 linear transformation M of scan RGB values followed by inverting, such that $CMY=1-(M \times RGB)$.

16. A decoding method, as in claim 9, further comprising calibrating the system by:
    printing a set of patches of known CMY values;
    scanning said patches;
    determining RGB values of said patches;
    building a transformation between RGB scan values and input CMY values; and
    using said estimates to determine $K_H$ such that $K_H=\min(C,M,Y)$.

17. A decoding method, as in claim 16, wherein the transformation is a 3×3 linear transformation M of RGB values followed by inverting, such that $CMY=1-(M \times RGB)$.

18. A decoding method as in claim 1, wherein $K_H$ is estimated from a high-resolution scan by a method of thresholding the scan pixels representing the printed K dots.

19. A decoding method, as in claim 1, wherein $K_H$ is evaluated conditional to the average said obtained color value of the decoding region, RGB.

20. A decoding method, as in claim 19, further comprising deriving from said RGB data the values of $K_H$, R, G, B, wherein K-colorant amount, $K_H$, is estimated from a high resolution scan, and R, G, and B are estimated from a down-scaled image, respectively.

21. A decoding method, as in claim 19, wherein estimating one out of N-GCRs comprises:
    determining one region of said input that was processed with each GCR; and
    for each region,
        computing $\beta(n,R,G,B)=E(K_H|R,G,B, GCR=n)$;
        determining $\beta$ that is the closest to $K_H$;
        creating a threshold $\tau(R,G,B)=[\beta(1, R,G,B)+\beta(2, R,G,B)]^{(1/2)}$; and
        comparing $K_H$ to threshold $\tau$ (R, G, B).

22. A decoding method, as in claim 1, wherein determining said GCR is accomplished by processing said estimated K-colorant amount, $K_H$, and said color value through a look-up table.

23. A decoding method, as in claim 22, wherein the look-up table has as inputs a transformation of scanner values.

24. A decoding method, as in claim 23, wherein the look-up table has output the estimated K-colorant amount for each of N possible GCR strategy, $K_1, K_2, \ldots, K_N$.

25. A decoding method, as in claim 24, wherein estimating the GCR comprises:
mapping the average scanned color of the region of interest through the lookup table to obtain K estimates for each possible GCR function, $K_1, K_2, \ldots, K_N$, for N GCR strategies;
comparing the K-colorant amount estimated from the region of interest, $K_H$, to each of the said K estimates from the lookup table mapping; and
selecting the GCR function whose K estimate is closest to $K_H$.

26. A decoding method, as in claim 25, wherein estimating the GCR comprises:
mapping the average scanned color of the region of interest through the lookup table to said obtain $K_T$;
comparing said estimated $K_H$ for the region of interest to $K_T$; and
selecting said GCR function corresponding to whether $K_H > K_T$ or $K_H < K_T$.

27. A decoding method, as in claim 24, in which two GCR strategies are used wherein the look-up table has as its output the threshold K-colorant value, $K_T$, for differentiating between the two strategies, which equal $(K_1+K_2)^{(1/2)}$.

28. A decoding method, as in claim 23, wherein an additional input to the look-up table is $K_H$ and wherein the look-up table has as its output a discrete number Q that indicates which GCR was used to print that given scanned pixel.

29. A decoding method, as in claim 28, wherein the derivation of Q comprises:
dividing the RGBK hyper-cube into N cells;
for every pixel in the image:
finding said pixel's RGBK cell; and
filling in said pixel's Q value; and
for each of said cells:
computing the histogram of the set of said Q values; and
associating said cell with the most popular Q value for that cell.

30. A decoding method, as in claim 29, wherein estimating the GCR comprises for every pixel in the low resolution image:
computing $RGBK_H$ quadruple;
entering said obtained RGB and said estimated $K_H$ into the cell LUT; and
retrieving Q thereby indicating the GCR estimation.

31. A decoding method, as in claim 22, wherein an additional output of the look-up table expresses a confidence in the ability to differentiate among the different GCRs for that particular local color.

32. A decoding method, as in claim 22, wherein construction of the look-up table comprises:
deriving a set of CMY data;
processing said CMY data through each of said N GCR functions to produce N sets of CMYK data;
generating at least one target of patches corresponding to the said N sets of CMYK data sets;
printing said at least one target;
scanning said at least one target using the scanner to be used in the decoding of subsequent watermarked images;
for each patch in the scanned image, estimating the amount of K-colorant, $K_H$, present;
deriving a relationship between a function of said scanned signals and said amount of $K_H$ present for each patch; and
estimating the GCR used for encoding said image region by using the said relationship in conjunction with the said K and average scanned color for the input electronic image.

33. A decoding method, as in claim 32, wherein the target generation comprises building a separate target for each GCR function.

34. A decoding method, as in claim 32, wherein the target generation comprises building a single target that includes multi-partite patches, wherein each part of a patch is determined from a different GCR function.

* * * * *